Figure 1:
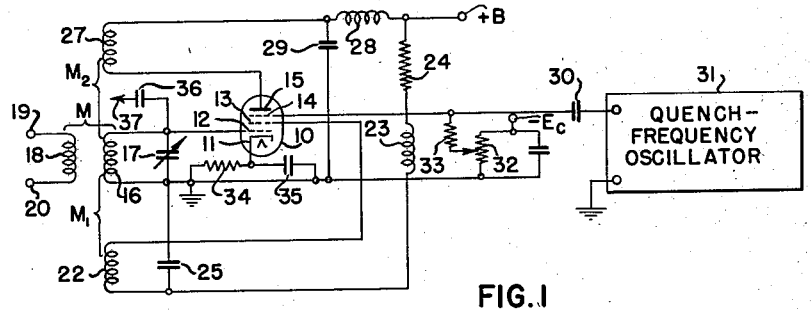

Aug. 17, 1948.     M. K. TAYLOR ET AL     2,447,375
WAVE-SIGNAL TRANSLATING SYSTEM
Filed Aug. 3, 1945

*INVENTORS*
MAURICE K. TAYLOR
IAN N. VAUGHAN-JONES
BY
*Harry C. Bage.*
ATTORNEY

Patented Aug. 17, 1948

2,447,375

UNITED STATES PATENT OFFICE 2,447,375

WAVE-SIGNAL TRANSLATING SYSTEM

Maurice K. Taylor and Ian Norman Vaughan-Jones, Hollinwood, England, assignors, by mesne assignments, to Hazeltine Research, Inc., Chicago, Ill., a corporation of Illinois Application August 3, 1945, Serial No. 608,664
In Great Britain June 1, 1943

Section 1, Public Law 690, August 8, 1946
Patent expires June 1, 1963

11 Claims. (Cl. 250—20)

This invention relates, in general, to wave-signal translating systems of the superregenerative type having a predetermined operating frequency and is particularly directed to such wave-signal translating systems adapted to employ a high-quench frequency. While the invention is subject to a variety of applications, it is especially suited for use in a superregenerative receiver and will be particularly described in that connection.

A regenerative receiver is similar to an oscillation generator in that provision is made for the feeding back of signal energy from the anode or output circuit of an electron-discharge device to its control electrode or input circuit. The arrangement is such that the energy fed back has a similar phase relation to the signal energy present in the input circuit. In view of the feedback feature, regeneration or a building up of the amplitude of the oscillations produced in the receiver circuit is promoted, thereby increasing the power obtainable from the output circuit. A superregenerative receiver essentially comprises the same type circuit arrangement but the feedback is periodically interrupted or quenched at a selected quench frequency. Such a receiver may be operated in either a linear or logarithmic mode. In the former, the generated oscillations are quenched before reaching saturation level while, in the latter, the oscillations attain saturation level in each quench cycle. For convenience, the remainder of this description concerns linear-mode operation, unless otherwise stated.

At the start of the feeding back of signal energy of correct phase or, expressed differently, at the start of the regenerative operating interval, the amplitude of the generated oscillations increases exponentially from an initial value corresponding to the signal level in the receiver circuit at the start of the regenerative interval. Where the superregenerative receiver is operated in the linear mode with a quench frequency high with respect to the highest modulation frequency of a received signal, the maximum amplitude attained by the generated oscillations is proportional to the amplitude of the signal energy in the receiver circuit at the start of the regenerative cycle, being dependent only upon the characteristics of the electron-discharge device or vacuum tube and its associated circuits. When the feedback is interrupted or quenched, as is characteristic of super-regenerative operation, the amplitude of the generated oscillations decreases exponentially until the amplitude of the signal level in the receiver circuit is only that due to the signal input. Thus, it is seen that in the superregenerative receiver the use of regenerative feedback followed by a subsequent quenching action causes a pulse or burst of oscillations to be produced which have a maximum amplitude proportional to the signal input at the instant regeneration is started.

If the process of providing a regenerative feedback and subsequent quenching is repeated, a series of amplified pulses is produced in the output circuit of the regenerator tube, individually having an amplitude proportional to the signal level in the receiver circuit at the start of the regenerative interval in which the particular pulse is produced. By allowing the amplitude of each pulse to decay to that of the signal input after every regenerative step, the envelope of the output pulses approximates the wave form of the wave-signal input. To achieve faithful reproduction with a superregenerative receiver operating in the described linear mode, the quench frequency should be high with respect to the highest frequency modulation component desired to be derived from a received signal. However, as the quench frequency is increased, the regenerative interval tends to decrease and tends to become insufficient to enable full advantage to be taken of the gain inherent in a superregenerative receiver. In other words, there is a tendency for the over-all amplification of the receiver to be diminished. Also, at high quench frequencies the time interval available in a given quench cycle for the generated oscillations to decay completely is lessened, so that the oscillations of a given quench cycle may not be completely suppressed before the initiation of the next succeeding quench cycle. Where this phenomenon is encountered, the envelope of the output signal from the receiver is subject to marked distortion.

It is possible to obtain an increase in amplification in the receiver for a given value of quench frequency by either of two methods: (1) the amount of regenerative feedback may be increased, or (2) the duration of the build-up or regenerative interval may be extended at the expense of the decay time. By the first of these methods the maximum amplitude obtained by each pulse produced in a single quench cycle may be such that, in the time allowable for the pulse to decay, the amplitude may not decrease to that of the input signal. The second method suggested has the disadvantage that the time allowable for the decay of the generated oscillations is reduced. It becomes evident, therefore, that the use of high quench frequencies is feasible if the rate of decay of the oscillations generated in a particular quench cycle is able to be accelerated. This rate of decay is dependent upon the values of resistance and inductance of the circuit in which the decay is produced and prior arrangements have been proposed which accelerate the decay by increasing the resistance or reducing the inductance of the regenerative circuit.

In one prior arrangement designed to simulate an increase in resistance during the decay interval, two triode tubes are employed having a common input circuit and separate output circuits. One output circuit is arranged to feed back oscillations of one phase into the input circuit and the other output circuit is arranged to feed back oscillations of an opposite phase into the input circuit. The tubes are controlled by an applied quench voltage to be alternately conductive so that the receiver circuit is rendered alternately regenerative and degenerative in succeeding operating intervals to attain superregenerative operation. Such prior arrangements require at least two vacuum tubes in the regenerative circuit which may be undesirable in particular installations.

In another prior receiver of the superregenerative type a single triode vacuum tube is used which has a normally balanced bridge circuit connected to the anode and included in a feedback path to the input circuit. The quench voltage is utilized periodically to unbalance the bridge circuit in opposite directions so that the feedback is alternately degenerative and regenerative. The bridge arrangement of such receivers may constitute an undesired constructional limitation for certain applications.

It is an object of the present invention, therefore, to provide an improved wave-signal translating system of the superregenerative type which substantially avoids one or more of the aforementioned limitations of prior arrangement.

It is a further object of the invention to provide an improved wave-signal translating system of the superregenerative type adapted to employ a quench frequency of relatively high value.

It is another object of the invention to provide a wave-signal translating system of the superregenerative type having an improved and simplified construction.

In accordance with the invention, a wave-signal translating system of the superregenerative type having a predetermined operating frequency comprises an electron-discharge device having an electron source and a plurality of electrodes disposed in a single electron-discharge path. An input circuit is provided for the device, being connected between the electron source and a first one of the plurality of electrodes. The device has a first output circuit connected to a second one of its plurality of electrodes and including means for feeding back signal energy of the operating frequency to the input circuit in a regenerative sense. The device has a second output circuit connected to a third one of its plurality of electrodes and also including means for feeding back signal energy of the operating frequency to the input circuit but in a degenerative sense. The system has means for utilizing an applied periodic quench signal to render the first and second output circuits alternately effective so that the translating system is alternately regenerative and degenerative in succeeding operating intervals of such relative duration as to provide superregeneration.

For a better understanding of the present invention, together with other and further objects thereof, reference is had to the following description taken in connection with the accompanying drawing, and its scope will be pointed out in the appended claims.

Figure 2:
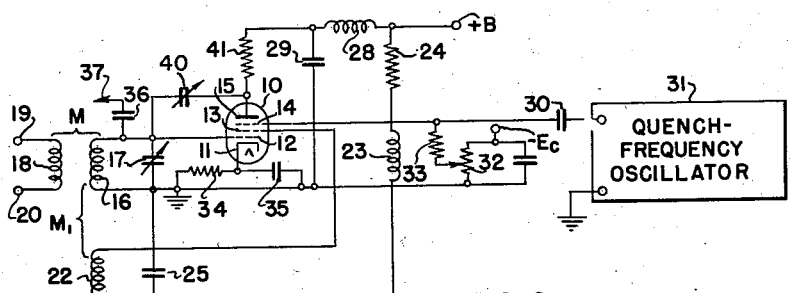
Figure 3:
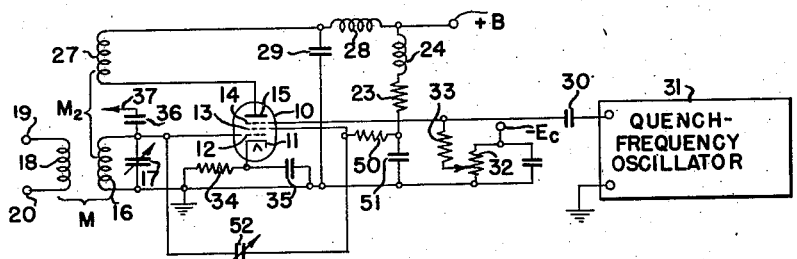

In the drawing, Fig. 1 is a schematic circuit diagram of a wave-signal translating system in accordance with the invention, and Figs. 2 and 3 individually comprise different modifications of the Fig. 1 arrangement.

Referring now more particularly to Fig. 1, the wave-signal translating system there represented is a superregenerative receiver having a predetermined operating frequency and embodying the present invention in one form. The receiver comprises an electron-discharge device 10 having an electron source and a plurality of electrodes disposed in a single electron-discharge path. Specifically, device 10 is a pentode-type tube having a cathode 11, an anode 15 and intervening electrodes 12, 13 and 14 all of which are arranged in a common electron-discharge path. Tube 10 has an input circuit connected between its electron source or cathode 11 and a first one of its remaining electrodes, namely, control electrode 12. This input circuit is provided by an inductor 16 tuned by an adjustable condenser 17 and is the frequency-determining circuit of the receiver. Received signals may be applied to the input circuit from an inductor 18 inductively coupled with the frequency-determining circuit as indicated at M and coupled to input terminals 19 and 20. Terminals 19 and 20 may be utilized to connect the receiver to any signal source, such as a receiving antenna system of conventional design and construction.

Tube 10 has a first output circuit connected to a second one of its electrodes and including means for feeding back signal energy of the operating frequency of the receiver to the input circuit 16, 17 in a regenerative sense. In the Fig. 1 embodiment, this first output circuit is connected to electrode 13 and includes an inductor 22 inductively coupled with input circuit 16, 17 as indicated at $M_1$. Inductor 22 is also connected to a source of space current, indicated +B, by way of a signal-frequency choke 23 and a series-connected resistor 24. Inductor 22 is by-passed for signal frequencies by means of a condenser 25 and is so poled with reference to inductor 16 that the signal energy fed back therethrough to the input circuit provides regeneration in the receiver circuit required for linear-mode operation.

Tube 10 has a second output circuit which is connected to a third one of its electrodes and also includes means for feeding back signal energy of the operating frequency of the receiver to the input circuit but in a degenerative sense. The second output circuit in the arrangement of Fig. 1 is connected with the anode 15 and includes an inductor 27 inductively coupled with input circuit 16, 17 as indicated at $M_2$. The space current source +B is connected with anode 15 through inductor 27 and a signal-frequency choke 28. Condenser 29 is a signal frequency by-pass for isolating signal frequencies from the space current supply. Inductor 27 is poled with respect to inductor 16 so that the signal energy fed back therethrough to the input circuit provides degeneration in the receiver circuit.

The receiver also includes means for utilizing an applied periodic quench signal to render the first and second output circuits alternately effective so that the receiver circuit is alternately regenerative and degenerative in succeeding operating intervals of such relative duration as to provide superregeneration. More particularly, this means comprises the electrode 14 which is coupled through a coupling condenser 30 to the output circuit of a quench-frequency oscillator 31. Oscillator 31 may be of any conventional design and construction for producing a periodic quench signal having a frequency that is high with reference to the highest frequency modulation component to be derived from a received signal. The quench signal may have any suitable wave form but, in the usual case, is of sinusoidal or rectangular wave form. An adjustable bias is applied to electrode 14 from a source indicated —Ec by way of an adjustable tap on a voltage divider 32 and a resistor 33. This adjustable biasing arrangement constitutes means for controlling the relative durations of the succeeding operating intervals in which the receiver circuit is alternately regenerative and degenerative as will be made clear hereinafter. A further biasing arrangement is located in the cathode circuit of tube 10 and includes the parallel combination of a resistor 34 and condenser 35.

An output signal may be derived from the input circuit of the receiver through a condenser 36 and supplied to a utilizing circuit as represented by the arrow 37. In most installations, the utilizing circuit includes a diode detector for detecting the output signal of the receiver to derive the modulation components of a received signal.

In adjusting the described receiver arrangement, the tap on voltage divider resistor 32 is positioned so that the mean potential of electrode 14 is negative with respect to that of cathode 11 when tube 10 is conducting. The circuit elements associated with tube 10 and the values of operating potentials applied thereto are such that the periodic quench signal supplied by oscillator 31 to electrode 14 periodically establishes in tube 10, in alternation, conditions of anode current cut-off and anode current flow. During that portion of each quench cycle in which anode current cutoff is established, the electrons emitted by cathode 11 are repelled by electrode 14 and are attracted by electrode 13. Consequently, the space current of tube 10 flows in the circuit including inductor 22. In view of the coupling between inductor 22 and the input circuit of tube 10, signal energy is fed back to the input circuit in a regenerative sense so that oscillations may be produced and may rapidly build up in amplitude in the receiver circuit during this operating interval. This interval of regenerative operation corresponds with the negative conductance interval of a conventional superregenerative receiver in which oscillations are initiated and increase in amplitude exponentially to a maximum value that is proportional to the signal input to the receiver at the instant the negative conductance or regenerative interval is commenced.

On the other hand, for the remaining portion of each quench cycle the potential of electrode 14 is such as to attract electrons to anode 15 and the majority of the electrons emitted from cathode 11 then reach the anode. During such operating intervals, anode current flows but the current in the circuit of electrode 13 is appreciably reduced. During this operating interval the oscillations appearing in the anode circuit of tube 10 are applied to the input circuit 16, 17 but in a degenerative sense in view of the coupling between inductors 16 and 27. The effect of the degenerative feedback is to accelerate the decay of the oscillations generated in the regenerative portion of the particular quench cycle, causing a decay of the oscillations which is much more rapid than that obtainable with the constants of the input circuit alone. Preferably, the degenerative feedback is adjusted so that the oscillations produced in the regenerative portion of a particular quench cycle are completely suppressed during the degenerative portion of this cycle. The degenerative operating interval corresponds with the interval of positive conductance of the conventional superregenerative receiver relied upon to suppress the oscillations generated in the preceding negative conductance interval.

In receiving a particular input signal applied to terminals 19 and 20, the condenser 17 of the input circuit is adjusted to establish an operating frequency of the receiver corresponding to that of the input signal. The quench voltage applied to electrode 14 renders the receiver alternately regenerative and degenerative in the manner aforedescribed to effect characteristic linear-mode superregenerative reception of the received signal. The output signal of the receiver obtained from coupling condenser 36 comprises pulses of radio-frequency energy having a frequency corresponding with the operating frequency of the receiver and occurring at a rate corresponding with the quench frequency. The amplitude of each such pulse is proportional to the amplitude of the input signal to the receiver at the instant the regenerative interval of a particular quench cycle is established in the receiver, that is, at the start of the quench cycle in which the receiver produces the particular pulse of radio-frequency energy. This mode of operation is generally similar to that of a conventional superregenerative receiver operating in a linear mode and will be understood by persons skilled in the art without further description.

It will be apparent that the time ratio of the interval of anode current to the interval of anode current cutoff, that is to say, the ratio of the degenerative to regenerative period should be a minimum to realize the maximum amplification obtainable with the superregenerative receiver. Where a sinusoidal quench signal is used, this time ratio may be controlled by adjusting the tap of voltage divider 32. Preferably, the precise adjustment of this tap is such that the degenerative interval has a duration equal to the minimum time required for the oscillations, built up in the regenerative portion of any quench cycle, to decay to a value equal to or less than the amplitude of the input signal being received. Where this adjustment condition is satisfied, the remaining portion of each quench period is available for regeneration, thus obtaining the maximum amplification possible having regard to the characteristics of tube 10 and its associated circuits.

It is highly desirable that the oscillations produced in any quench cycle decay to the requisite amplitude level at least at the moment the quench signal interrupts anode current in tube 10 if a faithful reproduction of the input signal is to be had. As mentioned above, if the oscillations in a particular quench cycle do not decay to the requisite value, the oscillations produced in the next succeeding quench cycle have an amplitude which may bear no relation to the amplitude of the applied input signal at the start of the succeeding regenerative interval in which such oscillations are produced. At the same time, if the degenerative or decay interval is made unnecessarily long or longer than is absolutely required, the regenerative portion of the quench cycle is less so that full advantage is not taken of the power gain obtainable from the receiver. In view of these considerations, it will be apparent that voltage divider 32 may be adjusted to effect a desired operating condition and response to received signals in the receiver.

In Fig. 2 there is represented a superregenerative receiver which is generally similar to that of Fig. 1 and corresponding components thereof are identified by the same reference characters. In Fig. 2, the coupling of inductor 22 in the circuit of electrode 13 with input circuit 16, 17 is relied upon for regenerative feedback. A controllable amount of degenerative feedback is provided by means of an adjustable condenser 40 connected to one terminal of a resistor 41 in the anode circuit of tube 10 and to control electrode 12. The operation of the Fig. 2 arrangement will be apparent from the foregoing discussion of Fig. 1. The adjustable condenser 40 renders the receiver more easily controlled since an independent adjustment is provided for the amount of degenerative feedback.

The Fig. 3 arrangement is also similar to that of Fig. 1 and corresponding components are again identified by the same reference characters. In Fig. 3, the circuit of electrode 13 includes a resistor 50 and by-pass condenser 51. In this case, however, an adjustable condenser 52 connected between electrode 13 and control electrode 12 causes the circuit of electrode 13 to provide a controllable degenerative feedback in the receiver. The regenerative feedback for this embodiment is provided by suitably poling inductor 27 in the anode circuit with reference to inductor 16 of the input circuit.

It will be understood that the present invention is not limited to the type oscillating circuit specifically illustrated in the drawing. Other well-known oscillating circuits may likewise be utilized in constructing the superregenerative receiver.

As already indicated, a superregenerative receiver of the type under consideration may be operated in the linear or logarithmic mode. To simplify the description, only linear-mode operation has been described. It will be immediately evident to those skilled in the art that, if desired, the amount of regenerative feedback provided may be adjusted in any of the illustrated embodiments to effect logarithmic operation.

The superregenerative system of this invention is especially suited for operation at high quench frequencies because of the accelerated decay phenomenon which is afforded by the degenerative feedback. The controllable bias circuit of control electrode 14, coupled with the controllable degenerative feedback of Figs. 2 and 3, enables optimum operating conditions to be achieved over a wide range of quench frequencies.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

2. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and including adjustable means for feeding back a controlled amount of signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

3. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and including an adjustable condenser connected to said first one of said electrodes for feeding back a controlled amount of signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

4. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, and means for applying a periodic quench signal to a fourth one of said electrodes to render said first and second output circuits alternately effective so that said translating system is alternately regenerative and degenerative in succeeding operating intervals of such relative duration as to provide superregeneration.

5. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, means for utilizing an applied periodic quench signal to render said first and second output circuits alternately effective so that said translating system is alternately regenerative and degenerative in succeeding operating intervals of such relative duration as to provide superregeneration, and adjustable biasing means associated with at least one of said electrodes for controlling the relative duration of said succeeding operating intervals of regeneration and degeneration.

6. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, means for applying a periodic quench signal to a fourth one of said electrodes to render said first and second output circuits alternately effective so that said translating system is alternately regenerative and degenerative in succeeding operating intervals of such relative duration as to provide superregeneration, and an adjustable bias source associated with said fourth one of said electrodes for controlling the relative duration of said succeeding operating intervals of regeneration and degeneration.

7. A wave-signal translating system having a predetermined operating frequency comprising, an electron-discharge device having an electron source and a plurality of electrodes disposed in a single electron-discharge path, an input circuit for said device including an inductor connected between said electron source and a first one of said electrodes, a first output circuit for said device including an inductor connected to a second one of said electrodes and inductively coupled to said inductor of said input circuit for feeding back signal energy of said predetermined frequency to said input circuit in a regenerative sense, a second output circuit for said device also including an inductor connected to a third one of said electrodes and inductively coupled to said inductor of said input circuit for feeding back signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

8. A wave-signal translating system having a predetermined operating frequency comprising, an electron-discharge device having an electron source and a plurality of electrodes disposed in a single electron-discharge path, an input circuit for said device including an inductor connected between said electron source and a first one of said electrodes, a first output circuit for said device including an inductor connected to a second one of said electrodes and inductively coupled to said inductor of said input circuit for feeding back signal energy of said predetermined frequency to said input circuit in a regenerative sense, a second output circuit for said device connected to a third one of said electrodes and including a condenser connected to said first one of said electrodes for feeding back signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

9. A wave-signal translating system having a predetermined operating frequency comprising, an electron-discharge device having an electron source and a plurality of electrodes disposed in a single electron-discharge path, an input circuit for said device connected between said electron source and a first one of said electrodes and tuned to said predetermined frequency, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, and means for utilizing an applied periodic quench signal to render said first and second output circuits alternately effective so that said translating system is alternately regenerative and degenerative in succeeding operating intervals of such relative duration as to provide superregeneration.

10. A wave-signal translating system having a predetermined operating frequency comprising, an electron-discharge device having a cathode, an anode and a plurality of intervening electrodes disposed in a single electron-discharge path, an input circuit for said device connected between said cathode and a first one of said electrodes, a first output circuit for said device connected to said anode and including means for feeding back signal energy of said predetermined frequency to said input circuit in a regenerative sense, a second output circuit for said device connected to a second one of said electrodes and also including means for feeding back signal energy of said predetermined frequency to said input circuit but in a degenerative sense, and means comprising a third one of said electrodes for utilizing an applied periodic quench signal to render said first and second output circuits alternately effective so that said translating system is alternately regenerative and degenerative in succeeding operating intervals of such relative duration as to provide superregeneration.

11. A wave-signal translating system having a predetermined operating frequency comprising, an electron-discharge device having an electron source and a plurality of electrodes disposed in a single electron-discharge path, an input circuit for said device connected between said electron source and a first one of said electrodes, a first output circuit for said device connected to a second one of said electrodes and including means for feeding back signal energy of said predetermined frequency to said input circuit in a regenerative sense, a second output circuit for said device connected to a third one of said electrodes and also including means for feeding back signal energy of said predetermined frequency to said input circuit but in a degenerative sense, and means comprising a fourth one of said electrodes positioned between said second and third electrodes for utilizing an applied periodic quench signal to render said first and second output circuits alternately effective so that said translating system is alternately regenerative and degenerative in succeeding operating intervals of such relative duration as to provide superregeneration.

MAURICE K. TAYLOR.
IAN NORMAN VAUGHAN-JONES.